Aug. 31, 1926.  
G. D. SUNDSTRAND  
1,598,172  
LATHE  
Original Filed Nov. 8, 1919  2 Sheets-Sheet 1
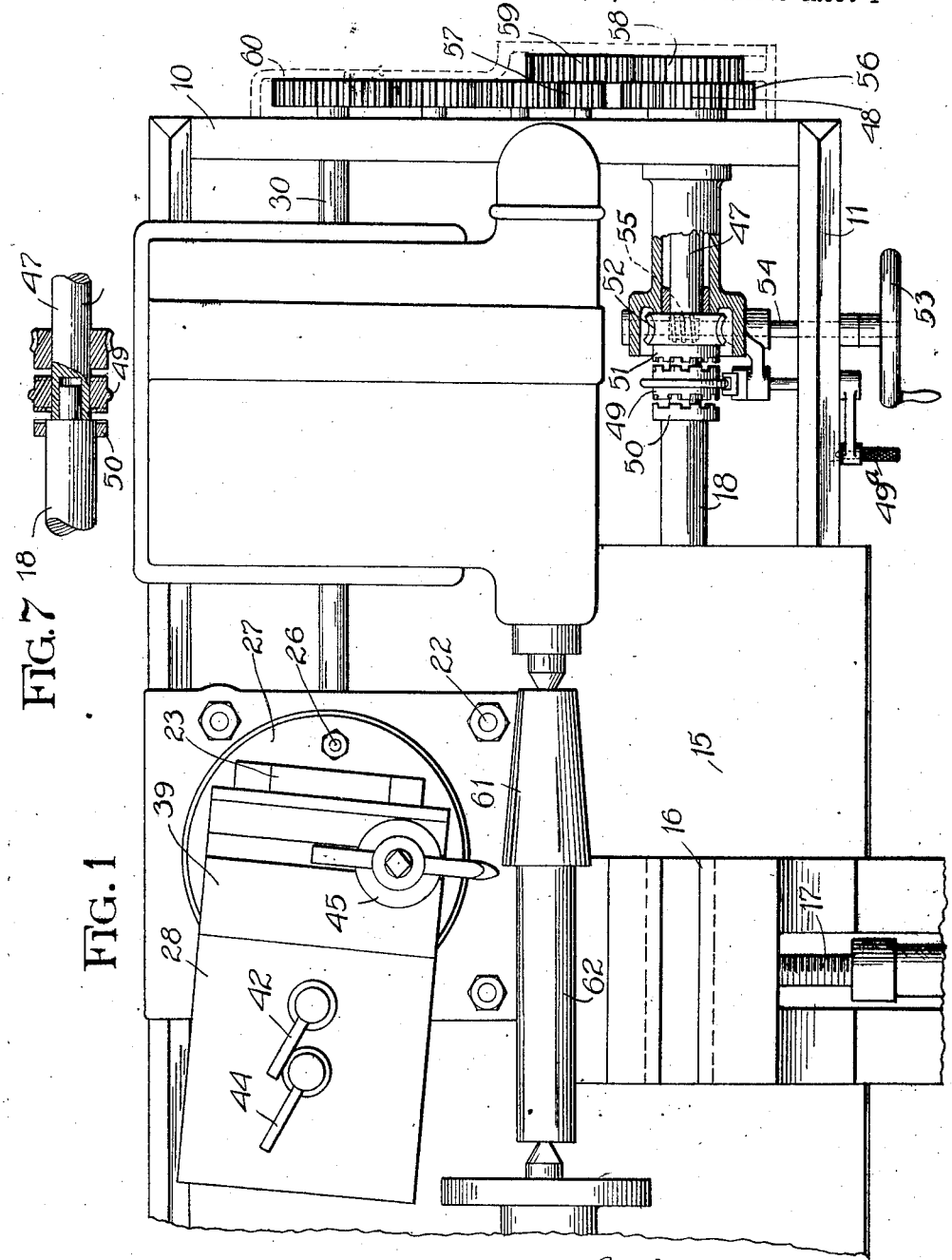
Inventor  
Gustaf D. Sundstrand  
By Miller Chindohl Parker  
Attys Aug. 31, 1926.
G. D. SUNDSTRAND
LATHE
Original Filed Nov. 8, 1919   2 Sheets-Sheet 2
1,598,172
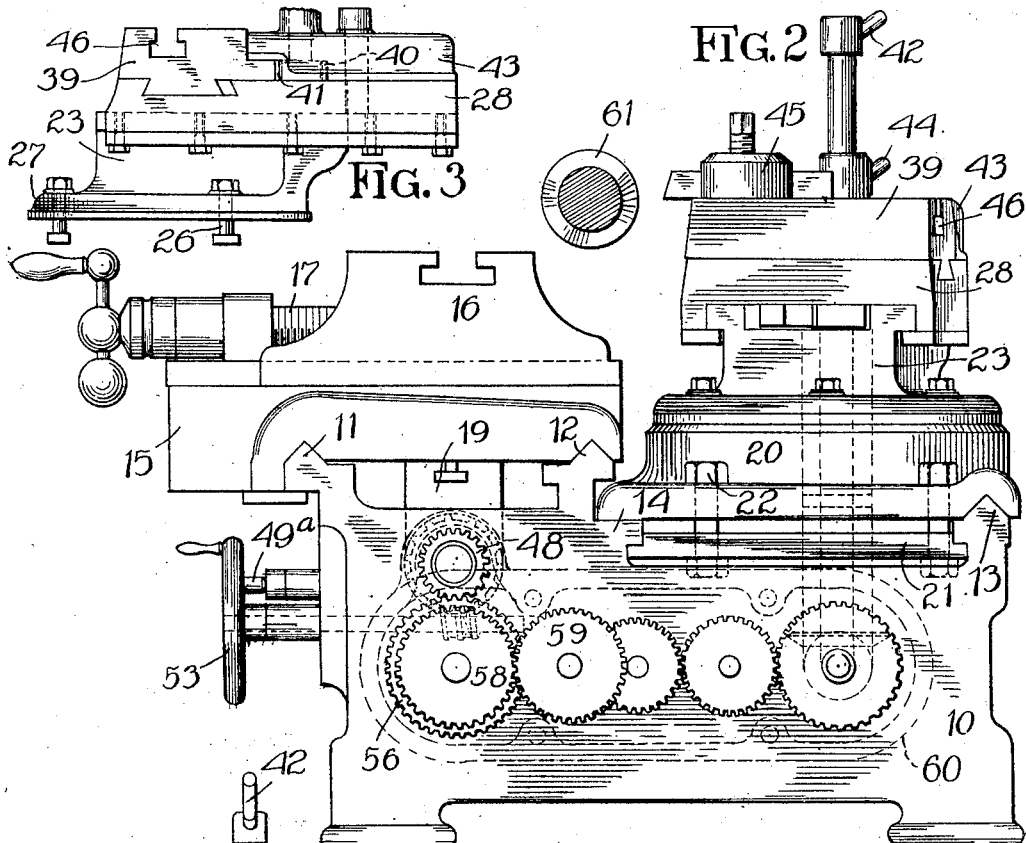
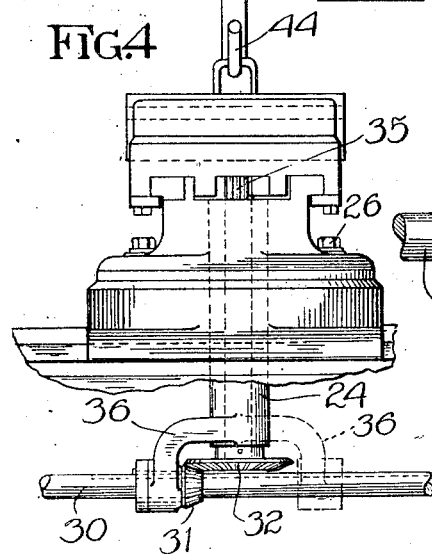
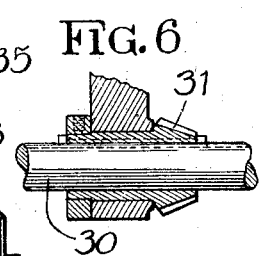
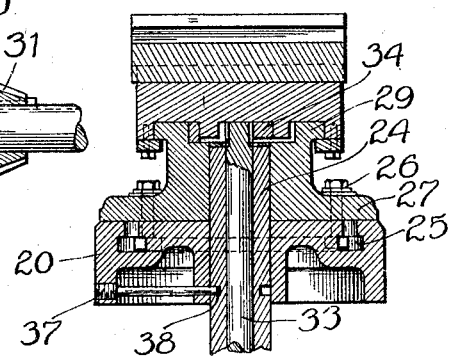
Inventor
Gustaf D. Sundstrand
By Miller Chindohl Parker
Attys Patented Aug. 31, 1926.

1,598,172

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

LATHE.

Application filed November 8, 1919, Serial No. 336,705. Renewed December 24, 1925.

My invention relates to lathes and more specifically to lathes of the semi-automatic type adapted to simultaneously perform more than one operation on a piece of stock.

One object of my invention is to provide a rear tool adapted to perform practically any ordinary turning operation simultaneously with the operation of a front tool on another portion of the stock.

A special object is to provide a rear tool which can be adjusted to be automatically fed in any direction whereby it may be used for facing, turning or taper work simultaneously with the operation of the front tool.

Another object is to provide means for transmitting power to such a tool in any position of adjustment.

Another object is to provide improved transmission means from the front to the rear driving shaft of the lathe.

Another object is to provide improved control means for the transmission to the rear tool.

Further objects and advantages of my invention will become apparent as the description proceeds.

In the accompanying drawings Figure 1 is a plan view of a portion of a lathe illustrating the application of my invention hereto.

Fig. 2 is an end view of the parts shown in Fig. 1 with the tail stock removed.

Fig. 3 is a view of the rotatable rear carriage and parts carried thereby.

Fig. 4 is a rear view of the entire rear tool and the transmission thereto.

Fig. 5 is a vertical section on the center line of the rear carriage and Figs. 6 and 7 are detail views.

The device I have selected as an illustrative embodiment of my invention comprises a bed 10 having front ways 11 and 12 and rear ways 13 and 14. The rearmost front way 12 and frontmost rear way 14 as clearly indicated in Fig. 2 are located approximately one below the other in the vertical plane of the lathe centers. The advantages of this construction have been fully explained in my co-pending application Serial No. 212,393 filed January 18, 1918, and need not be further outlined herein. It will be obvious however that my invention is not limited to the particular type of lathe bed disclosed but may be applied to any lathe having front and rear tools.

The front tool carriage 15 carrying the usual cross-slide 16 and cross feed screw 17 of any suitable or preferred construction may be mounted on the front ways 11 and 12 and driven my engagement of the front shaft 18 with the depending projection 19 carried by said front carriage 15.

The rear tool mechanism illustrated comprises a base 20 slidable longitudinally on the ways 13 and 14 and adapted to be clamped in a desired position by any suitable means such, for example, as clamping plate 21 (Fig. 2) and bolts 22. The carriage 15 and the rear-tool carriage or base 20 are slidable past each other. The base 20 supports a swivel or carriage 23 there being a vertically extending sleeve 24 (see Fig. 5) extending centrally upward through the base 20 and carriage 23 to form a vertical pivot around which the carriage may be rotated. Suitable means for clamping the carriage on the base are provided in the nature of a circular slot 25 having a T-shaped cross section receiving T-headed clamping bolts 26 extending upwardly through the peripheral flange 27 of the carriage 23. The carriage 23 supports a slide 28 on suitable ways. Power is transmitted to the slide 28 from a longitudinally extending rear tool drive shaft 30 (Fig. 4) through suitable bevel gears 31 and 32 to a vertical live axle 33 rotatable inside the sleeve 24. A rack 34 carried by the slide 28 meshes with the teeth 35 at the upper end of the live axle. The bevel gears 31 and 32 are supported in a depending bracket 36 integral with the sleeve 24, the gear 31 on the drive shaft 30 being suitably splined thereto so that the base 20 may be freely slid to any desired position.

I have provided an arrangement for conveniently reversing the direction of motion of the slide 28 by withdrawing the drive shaft 30 and swinging the bracket 36 through 180 degrees after which the drive shaft will be re-inserted. For this purpose the sleeve 24 is rotatably but non-slidably supported by the base 20 by means of a pin 37 (Fig. 5) suitably projecting through the walls of said base into an annular groove 38 in the sleeve.

The slide 28 may carry a tool holder of any desired or preferred construction. I have illustrated a transversely slidable tool holder 39 adapted to be transversely adjusted by means of a pinion 40 (Fig. 3) meshing with a rack 41 and controlled by the hand lever 42 and adapted to be clamped in adjusted position by suitable clamping plate 43 forced into clamping engagement by the hand lever 44. The usual tool post 45 may be slidably mounted in the T-slot 46 in the tool holder.

I have illustrated an all-gear transmission from the front drive shaft 18 to the rear drive shaft 30. As shown in Figs. 1 and 7 the main portion of the front drive shaft terminates inside the lathe bed and an alined transmission shaft 47 carries the pinion 48 from which the rear drive shaft is driven. I have provided means for actuating the rear tool either by power or by hand in the shape of a clutch 49 splined to the transmission shaft 47 and adapted to be moved from the position illustrated in Fig. 1 into engagement with the co-operating clutch member 50 on the front drive shaft to actuate the rear tool by power, or to move into engagement with the opposing clutch member 51 integrally formed or built into a unitary structure with the large worm gear 52 which may be actuated by hand by means of a suitable hand wheel 53, shaft 54 and worm 55. A suitable clutch control may be employed including a stop pin 49ª adapted to enter holes in the front wall of the lathe bed and hold the clutch in any one of its three positions of adjustment.

From the pinion 48 power is transmitter to the rear drive shaft through four intermediate shafts, the first two of which each carry two gears. On the first intermediate shaft is a large gear 56 that meshes with the pinion 48, and a smaller change-speed gear 58 that meshes with a change-speed gear 59 on the second intermediate shaft. The gear 59 is connected to rotate with the pinion 57 on the last-mentioned shaft, said pinion 57 transmitting power through the remaining intermediate shafts to the drive shaft 30. The gears 58 and 59 are readily removable whereby they may be interchanged or replaced to provide any desired speed ratio between the feed of the front carriage and the rear tool.

The gears at the end of the lathe bed are preferably protected by a gear cover indicated in dotted lines at 60 in Figs. 1 and 2 which may be open to allow ready removal of gears 58 and 59 or may be provided with a suitable flat cover.

In Fig. 1 I have illustrated one of the characteristic uses to which a device according to my invention may be put. As shown, the rear tool has been set so that it will machine the conical portion 61 while the front tool simultaneously machines the cylindrical portion 62 of a twist drill blank or other similar tool.

While I have illustrated and described in detail a preferred embodiment of my invention it should be clearly understood that the description is only for purposes of illustration and that many variations and modifications will naturally occur to those skilled in the art. I aim in the subjoined claims to cover all such legitimate modifications and variations.

I claim as my invention:

1. A lathe having, in combination, front and rear tool carriages, a drive shaft for said rear carriage, a bevel gear splined on said drive shaft, a bracket depending from said rear carriage and supporting said bevel gear, said bracket being pivoted about an axis perpendicular to said drive shaft whereby upon temporary removal of said drive shaft it may be swung 180 degrees to reverse the direction of motion transmitted by said bevel gear.

2. A lathe having, in combination, front and rear tool carriages, a power driven element operatively associated with said front carriage for feeding the same, a transmission element operatively connected for feeding the tool on said rear carriage, manual control means, and a clutch adapted to connect said transmisison element to said power driven element or to said manual control means.

3. A lathe having, in combination, front and rear tool carriages, said rear tool carriage comprising a longitudinally slidable base, a carriage member mounted on said base for pivotal movement, a slide reciprocating on said pivoted carriage member, a transmission for operating said slide either manually or by power from the front of the lathe, a cross slide on said slide and manual means for adjusting said cross slide and clamping it in adjusted position.

4. A lathe having, in combination, front and rear tool carriages, said rear tool carriage comprising a carriage member supported for pivotal movement, a reciprocating slide on said carriage and a transmisison to said slide including a live axle extending along the axis of rotation of said carriage, a gear at the upper end of said axle, and a cooperating rack on said slide, a sleeve supporting said live axle, a bevel gear at the lower end of said live axle, and a bracket at the lower end of said sleeve adapted to support a cooperating beveled pinion driven by a splined transmission shaft.

5. A lathe having, in combination, front and rear tool carriages, a power driven element operatively associated with said front carriage for feeding the same, a transmission element, an operative connection including change speed gears for actuating the tool on said rear carriage from said transmission element, manual control means, and a clutch adapted to connect said transmission element to said power driven element or to said manual control means.

6. A lathe having, in combination, front and rear tool carriages, said rear tool carriage comprising a carriage member supported for pivotal movement, a reciprocating slide on said carriage and a transmission to said slide including a live axle extending along the axis of rotation of said carriage, a gear at the upper end of said axle, and a cooperating rack on said slide, a sleeve supporting said live axle, a bevel gear at the lower end of said live axle, and a bracket at the lower end of said sleeve adapted to support a cooperating beveled pinion driven by a splined transmission shaft, said sleeve being rotatably mounted in said carriage whereby upon temporary removal of the transmission shaft it may be swung through 180 degrees to change the direction of the motion transmitted to said live axle.

7. A lathe having, in combination, a bed, a front tool carriage slidable longitudinally of the bed, a front shaft extending longitudinally of the bed, a rear shaft extending longitudinally of the bed, a gear train connecting said shafts, the front tool carriage being arranged to be moved by the front shaft, a base adjustable longitudinally of the bed rearwardly of the front tool carriage, means to clamp said base in adjusted position, a carriage mounted on the base for pivotal movement upon an axis perpendicular to the rear shaft, a rear tool slide on said pivoted carriage, and a connection between the rear shaft and said slide for moving the slide in any position of the base and of the carriage.

8. In a machine tool, in combination, a carriage, a tool support slidable on said carriage, a sleeve passing through said carriage, a shaft in said sleeve, and means for fastening said sleeve in said carriage with the shaft operatively connected to the tool support for transmission of power or for releasing the sleeve to permit downward removal of the sleeve and shaft.

9. In a machine tool, in combination, a carriage, a tool support slidable on said carriage, a rack carried by said tool support and overlying said carriage, and a shaft extending through said carriage, said shaft having a pinion at its upper end meshing with said rack, the outside diameter of said pinion being not greater than the outside diameter of the shaft.

10. In a machine tool, in combination, a rotatable carriage, a slide carried by said carriage, a power element extending along the axis of rotation of the carriage, and a connection between said power element and slide rendered operative by placing said power element in position.

11. In a lathe, in combination, a longitudinally slidable front carriage, a stationary rear carriage, a tool slide on said rear carriage, mounted on a vertical pivot to slide in any direction in a horizontal plane, and a unitary transmission for simultaneously moving said front carriage along the lathe bed and said tool slide on the rear carriage.

12. In a lathe, in combination, a longitudinally slidable front carriage, a stationary rear carriage, a tool slide on said rear carriage, mounted on a vertical pivot to slide in any direction in a horizontal plane, and a unitary transmission including change speed gears between the front carriage and the tool slide for simultaneously moving said front carriage along the lathe bed and said tool slide on the rear carriage.

13. In a machine tool, in combination, a base, a rotatable carriage on said base, a sleeve projecting upward through said base and said carriage and forming a pintle for said carriage, a tool slide on said carriage, a drive shaft in said sleeve, an operative connection between said shaft and said tool slide, said sleeve being rotatable in said base and carriage and readily removable therefrom, and quick detachable means for holding said sleeve against withdrawal.

14. In a machine tool, in combination, a base, a rotatable carriage on said base, a sleeve projecting upward through said base and said carriage and forming a pintle for said carriage, a tool slide on said carriage, a drive shaft in said sleeve, and an operative connection between said shaft and said tool slide.

15. In a machine tool, in combination, a base, a rotatable carriage on said base, a sleeve projecting upward through said base and said carriage and forming a pintle for said carriage, a tool slide on said carriage, a drive shaft in said sleeve, an operative connection between said shaft and said tool slide, and means for holding said sleeve against vertical displacement but not against rotation.

16. A lathe having, in combination, a bed, a front tool carriage slidable longitudinally of the bed, a rear shaft extending longitudinally of the bed, a base adjustable longitudinally of the bed rearwardly of the front tool carriage, means to clamp said base in adjusted position, a carriage mounted on the base for pivotal movement upon an axis perpendicular to the rear shaft, a rear tool slide on said pivoted carriage, and a connection between the rear shaft and said slide for moving the slide in any position of the base and the carriage.

17. A lathe having, in combination, a bed, a front tool carriage slidable longitudinally of the bed, a front shaft extending longitudinally of the bed, a rear shaft extending longitudinally of the bed, a gear train connecting the ends of said shafts, the front tool carriage being arranged to be moved by the front shaft, and a rear tool slide arranged to be moved by the rear shaft.

18. A lathe having, in combination, a bed, a front tool carriage slidable longitudinally of the bed, a front shaft extending longitudinally of the bed, a rear shaft extending longitudinally of the bed, means for driving said shafts, the front tool carriage being arranged to be moved by the front shaft, a base adjustable longitudinally of the bed rearwardly of the front tool carriage and adapted to be held in adjusted position, a carriage mounted on the base for pivotal movement upon an axis perpendicular to the rear shaft, a rear tool slide on said pivoted carriage, and a connection between the rear shaft and said slide for moving the slide in any position of the base and of the carriage.

19. A lathe having, in combination, a bed, a front tool carriage slidable longitudinally of the bed, a rear shaft extending longitudinally of the bed, a base adjustable longitudinally of the bed rearwardly of the front tool carriage, a carriage mounted on the base for pivotal movement upon an axis perpendicular to the rear shaft, a rear tool slide on said pivoted carriage, and a connection between the rear shaft and said slide for moving the slide in any position of the base and the carriage.

20. A lathe having, in combination, a bed, a shaft extending longitudinally of the bed, a base arranged to be held in adjusted position longitudinally of the bed, a carriage mounted on the base for pivotal movement upon an axis perpendicular to said shaft, a tool slide on said carriage, and a connection between said shaft and said slide for moving the slide in any position of the base and the carriage.

21. A lathe having, in combination, a bed, a shaft extending longitudinally of the bed, a tool carriage, a base mounted for longitudinal adjustment on the bed and providing a support for said carriage whereby the latter may be adjusted on an upright axis, a tool slide on said carriage, and a connection between said shaft and said slide for moving the slide in any position of the base and the carriage.

22. In a lathe, the combination of a bed, a support on the bed, a slide mounted on said support for pivotal adjustment on an upright axis and also adapted for feeding movement transversely of said axis, an upright shaft disposed coaxially of the axis of pivotal adjustment of the slide, a pinion on the upper end of said shaft, a rack rigid with the slide with which said pinion is adapted to mesh, and means for driving said shaft.

23. A lathe having, in combination, a bed, a slide mounted for pivotal adjustment on an upright axis and also adapted for feeding movement transversely of said axis, an upright shaft disposed coaxially of said upright axis, a rack and pinion connection between the upper end of said shaft and said slide, a second shaft extending longitudinally of the bed, drive means at one end of the bed for driving the second shaft, and an operative connection between said upright shaft and said second shaft.

24. In a lathe, the combination of a bed, a support on the bed, a slide mounted on said support for pivotal adjustment on an upright axis and also adapted for feeding movement transversely of said axis, an upright shaft disposed coaxially of the axis of pivotal adjustment of the slide, a pinion on the upper end of said shaft, a rack rigid with the slide with which said pinion is adapted to mesh, and means for driving said shaft, said support being adjustable longitudinally of the bed, and said driving means being operative in any position of longitudinal adjustment of the support.

25. A lathe having, in combination, a front carriage, a longitudinally extending shaft for driving said front carriage, a rear carriage, a tool on said rear carriage, a second longitudinally extending shaft, a connection adapted to transmit power to said tool from said second mentioned longitudinal shaft, and connections between said longitudinal shafts for the transmission of power.

26. A lathe having, in combination, a pair of ways, a tool carriage on said ways, ways on said tool carriage, a slide on said carriage ways, a rack on said slide, a longitudinally extending shaft, a bracket depending from said tool carriage and carrying a sleeve splined on said shaft, and a connection for the transmission of power from said sleeve to said rack.

27. A lathe having, in combination, a bed, a front tool carriage slidable longitudinally of the bed, a rear tool slide mounted for movement in any one of a plurality of different directions transversely of the bed, a front shaft extending longitudinally of the bed, a rear shaft extending longitudinally of the bed, power means for driving said shafts, the front tool carriage being arranged to be moved by the front shaft and the rear tool slide arranged to be moved by the rear shaft.

In testimony whereof, I have hereunto set my hand.

GUSTAF DAVID SUNDSTRAND.

Certificate of Correction.

It is hereby certified that in Letters Patent No. 1,598,172, granted August 31, 1926, upon the application of Gustaf David Sundstrand, of Rockford, Illinois, for an improvement in "Lathes," errors appear in the printed specification requiring correction as follows: Page 3, after line 52, insert the following as claim 9:

*9. In a machine tool, in combination, a rotatable carriage, means for clamping said carriage in position, a tool support slidable on said carriage, and means extending upward along the axis of rotation of the carriage for the transmission of power to the tool support, said means being readily removable downward through said carriage.* pages 3 and 4, strike out claim 17, comprising lines 130 and 1 to 8, respectively; pages 3 and 4, for the ordinals of claims " 9, 10, 11, 12, 13, 14, 15, and 16 " read *10, 11, 12, 13, 14, 15, 16, and 17*, respectively; and that the said Letters Patent should be read with these corrections therein that the same may conform to the record of the case in the Patent Office.

Signed and sealed this 5th day of October, A. D. 1926.

[SEAL.]

M. J. MOORE,
*Acting Commissioner of Patents.*